(12) United States Patent
Tange

(10) Patent No.: US 7,896,380 B2
(45) Date of Patent: Mar. 1, 2011

(54) TOP COVER FOR HEADSET OF BICYCLE

(75) Inventor: Satoshi Tange, Osaka (JP)

(73) Assignee: Tange Seiki Taichung Co., Ltd., Taichung (TW)

( * ) Notice: Subject to any disclaimer, the term of this patent is extended or adjusted under 35 U.S.C. 154(b) by 76 days.

(21) Appl. No.: 12/352,496

(22) Filed: Jan. 12, 2009

(65) Prior Publication Data
US 2010/0096830 A1 Apr. 22, 2010

(30) Foreign Application Priority Data
Oct. 22, 2008 (TW) ............................. 97140548 A

(51) Int. Cl.
*B62K 21/00* (2006.01)
(52) U.S. Cl. ...................... 280/279; 280/276
(58) Field of Classification Search .............. 280/279, 280/276
See application file for complete search history.

(56) References Cited

U.S. PATENT DOCUMENTS

| 5,331,864 A | * | 7/1994 | Chi ........................... 74/551.1 |
| 5,791,671 A | * | 8/1998 | Tang et al. ................. 280/264 |
| 5,964,474 A | * | 10/1999 | Chen ......................... 280/279 |
| 6,322,283 B1 | * | 11/2001 | Chen ......................... 403/345 |
| 6,416,071 B2 | * | 7/2002 | Marui ........................ 280/279 |
| 2002/0139217 A1 | * | 10/2002 | Montague et al. ............ 74/493 |
| 2004/0050202 A1 | * | 3/2004 | Montague et al. .......... 74/551.3 |
| 2006/0038376 A1 | * | 2/2006 | Okajima et al. ............. 280/276 |
| 2006/0055146 A1 | * | 3/2006 | Ueno ......................... 280/280 |
| 2007/0052201 A1 | * | 3/2007 | Hermansen et al. ......... 280/279 |

* cited by examiner

*Primary Examiner*—Lesley Morris
*Assistant Examiner*—Tashiana Adams
(74) *Attorney, Agent, or Firm*—Browdy and Neimark, PLLC

(57) ABSTRACT

A top cover for a headset of a bicycle includes a bottom ring, a side wall, a C-shaped clip and a fastening unit. The side wall extends upwards from the bottom ring. The C-shaped clip extends upwards from a top end of the side wall and has a through hole at each of two distal ends thereof. The fastening unit passes through the through holes of the C-shaped clip for tightening the C-shaped clip. Thus, the top cover of the present invention can enhance convenience of assembly and disassembly of the bicycle, and prevent components of the headset from getting lost during assembly and disassembly of the bicycle.

15 Claims, 6 Drawing Sheets

TOP COVER FOR HEADSET OF BICYCLE

BACKGROUND OF THE INVENTION

1. Field of the Invention

The present invention relates generally to a bicycle, and more specifically to a top cover for a headset of a bicycle, which can enhance convenience of assembly and disassembly of the bicycle and prevent losing parts of the headset.

2. Description of the Related Art

FIG. 1 shows a conventional headset 1 for a bicycle, which is configured between a steering tube 4 and a head tube 5 for enabling a front fork 6 to be rotatable relative to the head tube 5, comprising an upper set 2 and a lower set 3. A handlebar stem 7 is mounted on a top end of the steering tube 4. The upper set 2 is located between the handlebar stem 7 and the head tube 5 such that the parts of the upper set 2 is fastened.

In order to carry or store the bicycle conveniently, the handlebar stem 7 needs to be disassembled from the steering tube 4. Once the handlebar stem 7 is dismounted, the upper set 2 and the lower set 3 can't be retainable. Therefore, a user has to draw the steering tube 4 from the head tube 5 to allow the separation of the front fork 6 and the bicycle frame. The upper set 2 and the lower set 3 have to be disassembled, preventing from getting lost. In other words, although the user just takes the handlebar stem 7 apart, the front fork 6 and the headset 1 have to be disassembled together with the handlebar stem 7 due to the structural design of the headset 1, resulting in inconvenience of assembly and disassembly of the bicycle, and rising the risk of losing components of the headset 1.

SUMMARY OF THE INVENTION

The present invention has been accomplished in view of the above-noted circumstances. It is one objective of the present invention to provide a top cover for a headset of a bicycle, which can enhance the convenience of assembly and disassembly of the bicycle, and prevent components of the headset from getting lost.

To achieve this objective of the present invention, the top cover comprises a bottom ring, a side wall, a C-shaped clip and a fastening unit. The side wall extends upwards from the bottom ring. The C-shaped clip extends upwards from a top end of the side wall and having a through hole at each of two distal ends thereof. The fastening unit passes through the through holes of the C-shaped clip for tightening the C-shaped clip.

Accordingly, the top cover of the present invention can enhance convenience of assembly and disassembly of the bicycle, and prevent losing parts of the headset.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
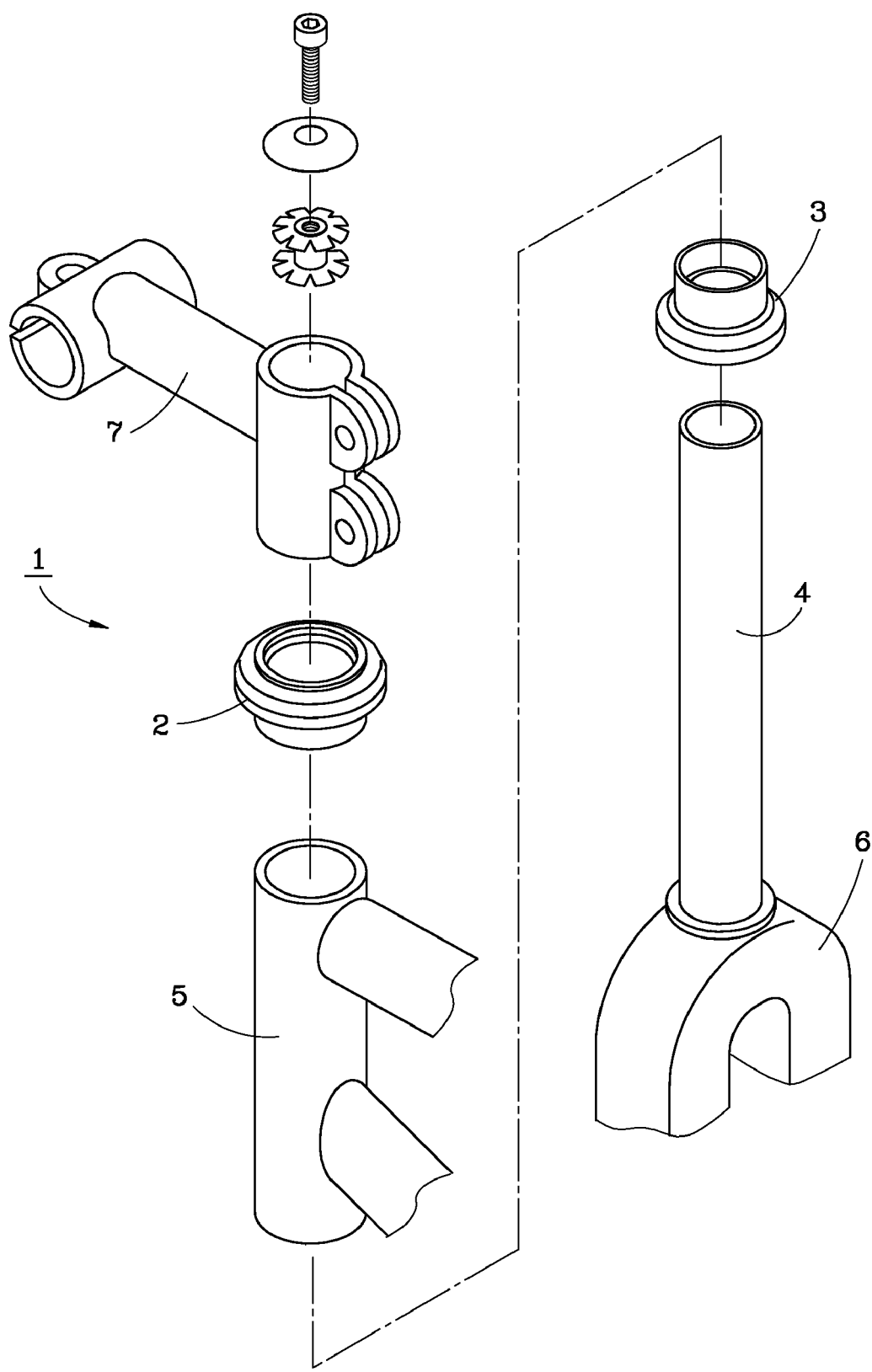
FIG. 1 is a partially exploded view of a bicycle according to a prior art.
Figure 2:
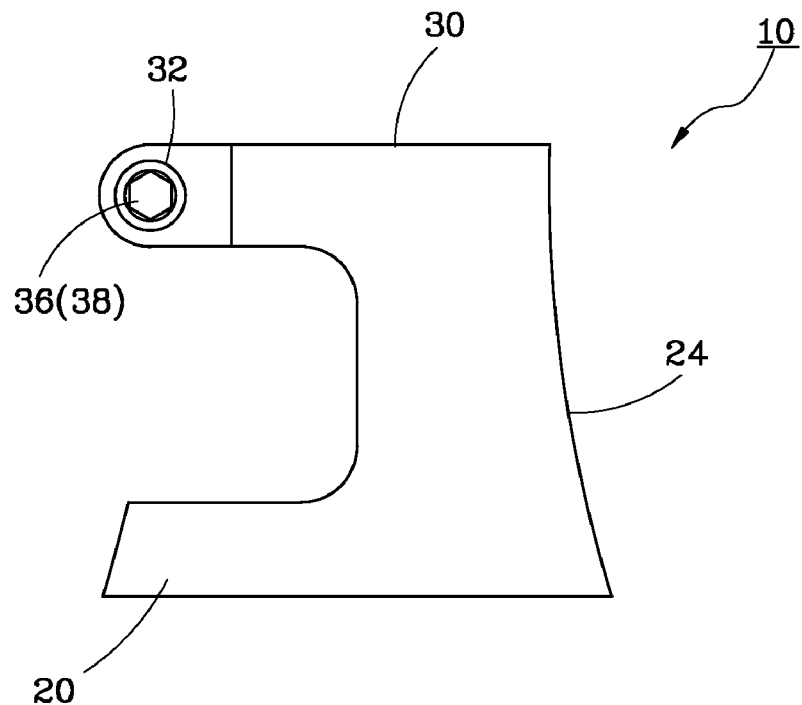
FIG. 2 is a front view of a top cover according to a first preferred embodiment of the present invention.
Figure 3:
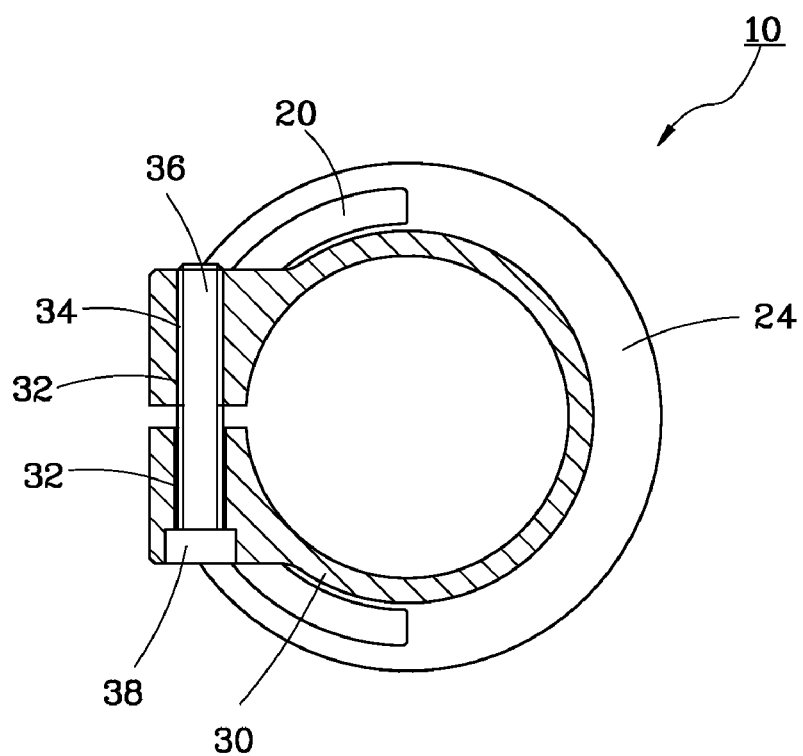
FIG. 3 is a top view of the top cover according to the first preferred embodiment of the present invention.
Figure 4:
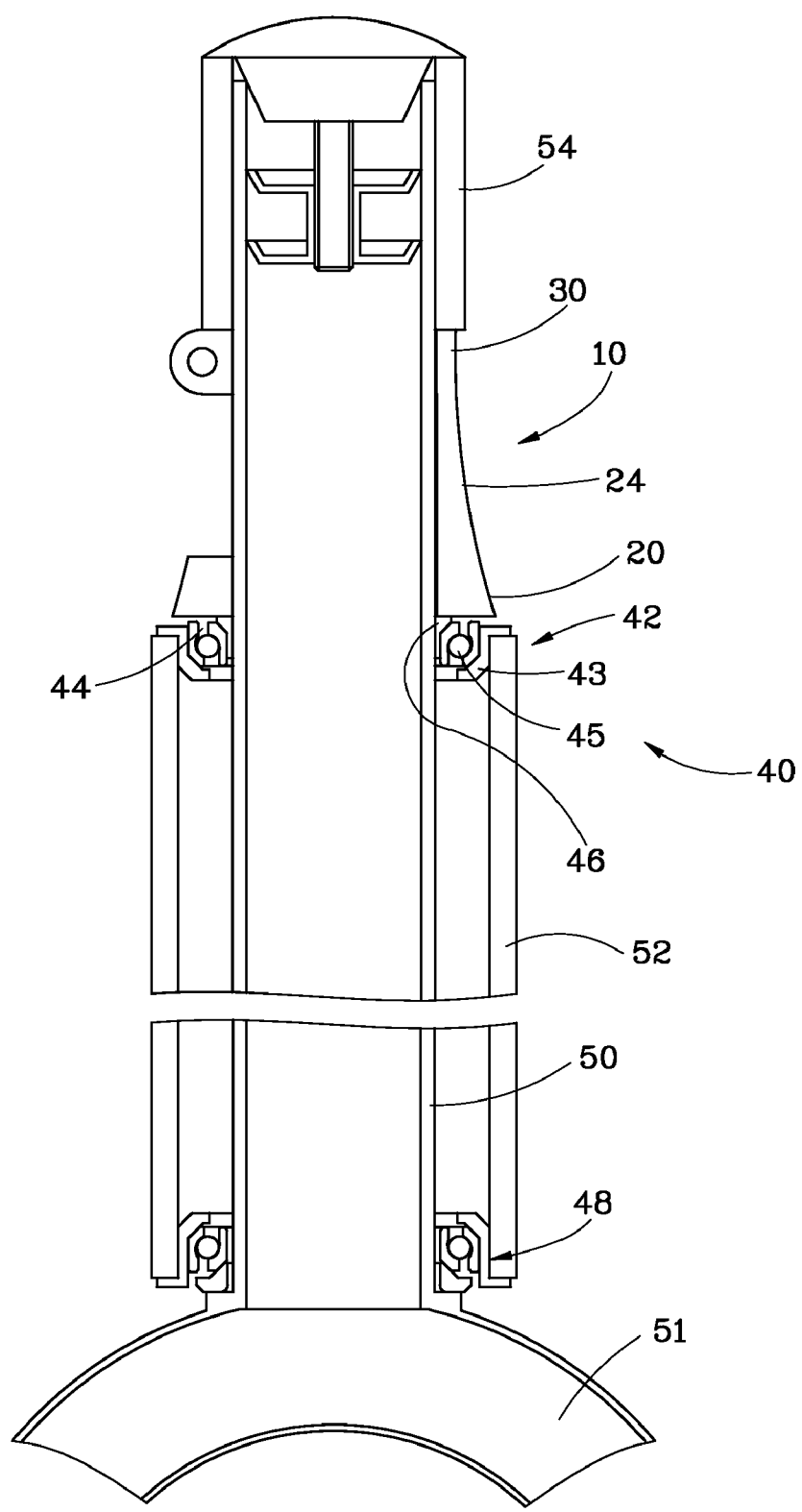
FIG. 4 is a schematic view of the top cover assembled in a bicycle according to the first preferred embodiment of the present invention.

As shown in FIGS. 2 to 4, a top cover 10 for a headset in accordance with the first preferred embodiment of the present invention comprises a bottom ring 20, a side wall 24, a C-shaped clip 30 and a fastening unit 36.

The bottom ring 20 has a tapered shape in which the diameter of the bottom ring 20 is gradually reduced from the bottom to the top. The side wall 24 extends upwards from the right-side circumference of the bottom ring 20. The C-shaped clip 30 extends upwards from the top end of the side wall 24 and has a through hole 32 at each of two distal ends thereof. The fastening unit 36 passes through the through holes 32 of the C-shaped clip 30 for tightening the C-shaped clip 30.

In fact, one of the through holes 32 of the C-shaped clip 30 has internal threads 34, as shown in FIG. 3. The fastening unit 36 includes a bolt 38 that passes through the through holes 32 of the C-shaped clip 30 and is threaded with the threads 34 of the through hole 32 so as to tighten the C-shaped clip 30. When the headset 40 is configured on a vehicle, such as a bicycle, a scooter, or a tricycle, as shown in FIG. 4, an upper set 42 can be fixed between a head tube 52 and a steering tube 50 in such a way that the steering tube 50 is constricted by the C-shaped clip 30 of the top cover 10. Therefore, the upper set 42 doesn't get loose even though a handlebar stem 54 that is connected with a top end of the steering tube 50 is disassembled from the steering tube 50. As a result, it is not necessary for a user to take a front fork 51 apart after the handlebar stem 54 is disassembled, so the convenience of assembly and disassembly of the bicycle can be enhanced, and the risk of losing components of the headset 40 can be reduced by means of the top cover 10 of the present invention.

FIG. 4 further shows the structural relationship between the top cover 10 and the upper set 42 of the headset 40. The headset 40 comprises the upper set 42 and a lower set 48, both of which are disposed between the head tube 52 and the steering tube 50. The handlebar stem 54 is mounted on a top end of the steering tube 50.

The upper set 42 includes an upper cup 43, a bearing 45, a compression ring 46 and the top cover 10. The upper cup 43 is disposed on the top end of the head tube 52 and provided with an accommodation space 44 therein. The bearing 45 is received in the accommodation space 44 and has an outer periphery abutted against the upper cup 43. The compression ring 46 is abutted against an inner periphery of the bearing 45 and tightened onto the steering tube 50. The top cover 10 covers the upper cup 43 in such a manner that the bottom ring 20 is abutted against the top of the compression ring 46, and the C-shaped clip 30 is tightened onto the steering tube 50 through the fastening unit 36. The lower set 48 has similar structure with the prior art and isn't connected with the top cover 10, so no further detailed description thereof is necessary hereinafter.

By means of the aforesaid design, when the handlebar stem 54 is dismounted from the steering tube 50, the upper set 42 doesn't get loose due to the top cover 10, thereby eliminating the drawback of headset according to the prior art.

Figure 5:
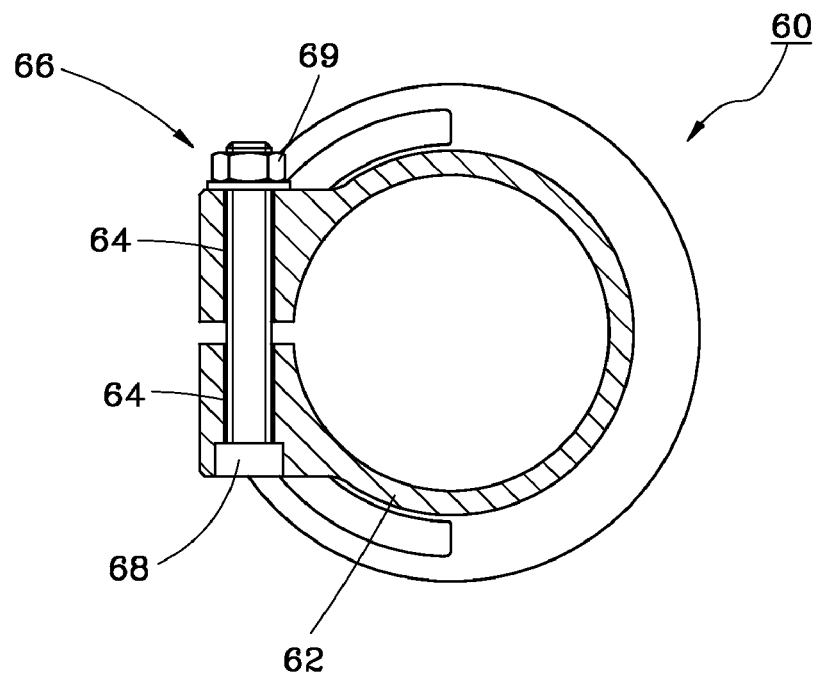
FIG. 5 is a top view of the top cover according to a second preferred embodiment of the present invention.

The top cover can be made with various kinds of design on the basis of the spirit of the present invention. For example, the extending height of the side wall 24 can be changeable subject to the actual need, and the fastening unit 36 has a lot of alternative structures. As shown in FIG. 5, a top cover 60 in accordance with the second preferred embodiment of the present invention comprises a C-shaped clip 62 having two through holes 64 without internal threads, and a fastening unit 66 having a bolt 68 and a nut 69. The bolt 68 passes through the through holes 64 of the C-shaped clip 62, and the nut 69 is threaded onto the bolt 68 for tightening the C-shaped clip 62. Thus, the top cover 60 and the steering tube (not shown) are connected together.

Figure 6:
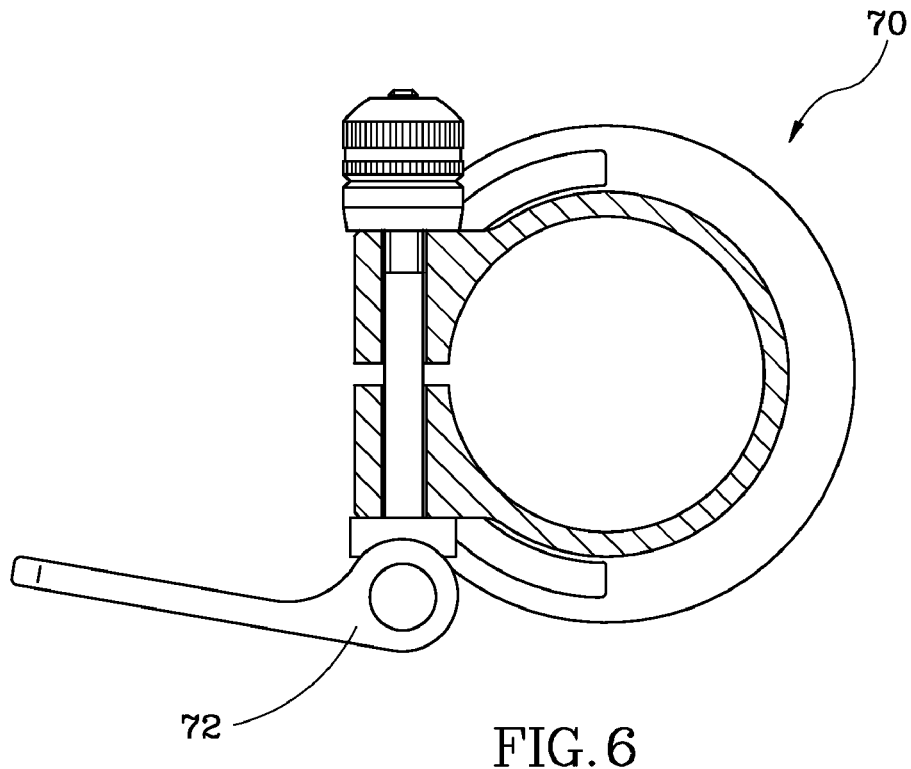
FIG. 6 is a top view of the top cover according to a third preferred embodiment of the present invention.

FIG. 6 shows a top cover 70 in accordance with the third preferred embodiment of the present invention, comprising a fastening unit 72 that is embodied as a well-known quick release unit.

Figure 7:
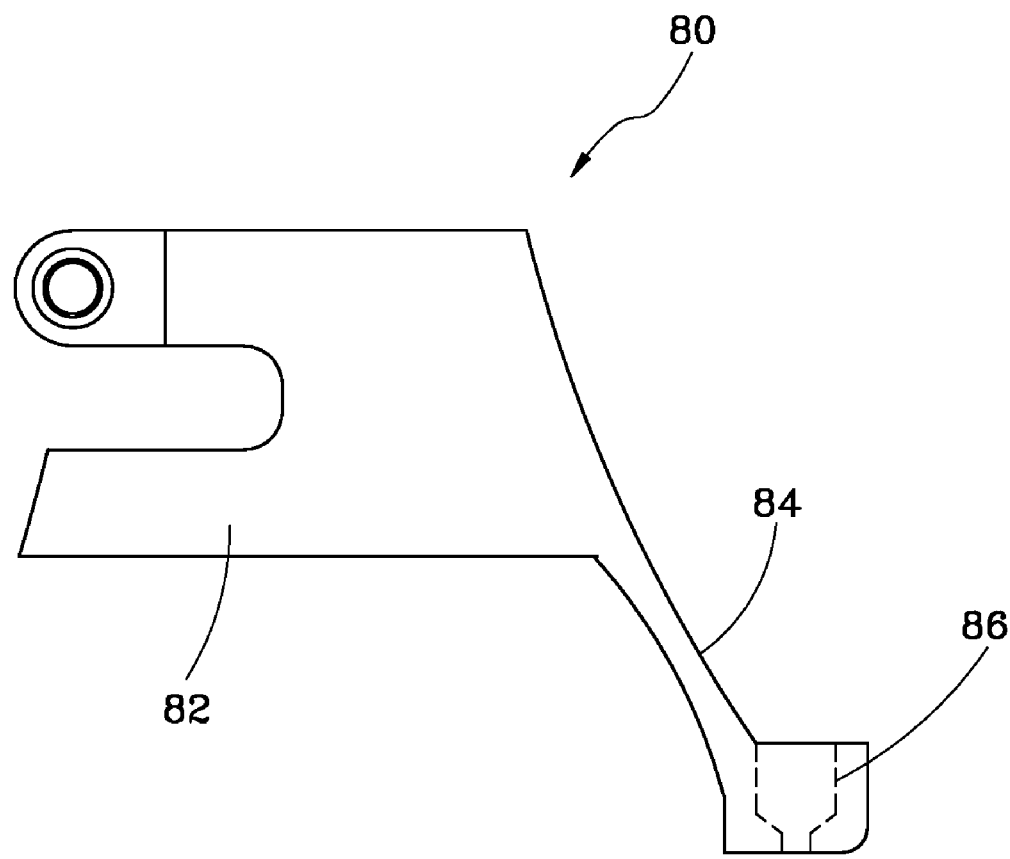
FIG. 7 is a front view of the top cover according to a forth preferred embodiment of the present invention.

FIG. 7 shows a top cover 80 in accordance with the forth preferred embodiment of the present invention, comprising a bottom ring 82 having a suspension arm 84. The suspension arm 84 has a through hole 86 at a distal end thereof for penetration of brake cables (not shown) of the bicycle, thereby providing the function of retaining the brake cables.

Figure 8:
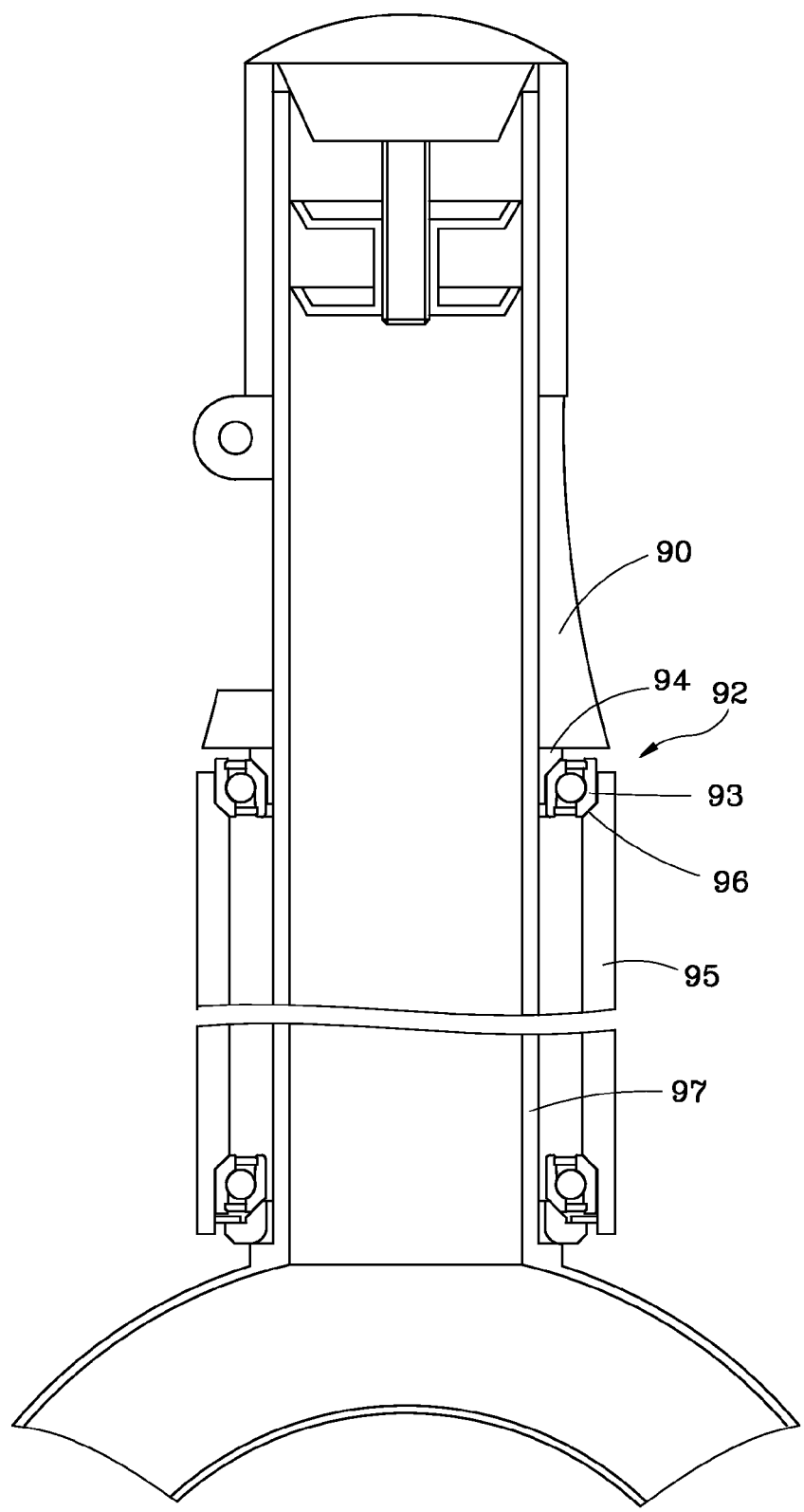
FIG. 8 is a schematic view of the top cover assembled in a bicycle according to a fifth preferred embodiment of the present invention.

Besides, the top cover of the present invention can be cooperated to different kinds of upper set. As shown in FIG. 8, the top cover 90 of the present invention is fitted to an upper set 92 that comprises a bearing 93 received in an accommodation space 96 located at a top of the head tube 95, and a compression ring 94 abutted against the bearing 93 and tightened onto the steering tube 97, but eliminates the upper cup mentioned in the first preferred embodiment of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A top cover for a headset of a bicycle, comprising:
   a bottom ring;
   a side wall extending upwards from said bottom ring;
   a C-shaped clip extending upwards from a top end of said side wall and having a through hole at each of two distal ends of said C-shaped clip; and
   a fastening unit passing through said through holes of said C-shaped clip for tightening said C-shaped clip,
   wherein said side wall connects said C-shaded clip and said bottom ring, and said C-shaped clip and said bottom ring are spaced from one another.

2. The top cover as claimed in claim 1, wherein said fastening unit has a bolt passing through said through holes of said C-shaped clip, and a nut threaded onto said bolt.

3. The top cover as claimed in claim 1, wherein said fastening unit is a quick release unit.

4. The top cover as claimed in claim 1, wherein said fastening unit has a bolt passing through said through holes of said C-shaped clip and one of said through holes of said C-shaped clip has internal threads to be threaded with said bolt.

5. The top cover as claimed in claim 1, wherein said bottom ring has a suspension arm having a through hole at a distal end thereof.

6. An upper set for a headset of a bicycle, comprising:
   an upper cup having an accommodation space therein;
   a bearing received in said accommodation space of said upper cup and having an outer periphery abutted against said upper cup;
   a compression ring abutted against an inner periphery of said bearing; and
   a top cover covered onto said upper cup and provided with a bottom ring abutted against a top of said compression ring, a side wall extending upwards from said bottom ring, a C-shaped clip extending upwards from a top end of said side wall and having a through hole at each of two distal ends of said C-shaped clip, and a fastening unit passing through said through holes of said C-shaped clip for tightening said C-shaped clip,
   wherein said side wall connects said C-shaped clip and said bottom ring, and said C-shaped clip and said bottom ring are spaced from one another.

7. The upper set as claimed in claim 6, wherein said fastening unit has a bolt passing through said through holes of said C-shaped clip, and a nut threaded onto said bolt.

8. The upper set as claimed in claim 6, wherein said fastening unit is a quick release unit.

9. The upper set as claimed in claim 6, wherein said fastening unit has a bolt passing through said through holes of said C-shaped clip and one of said through holes of said C-shaped clip has internal threads to be threaded with said bolt.

10. The upper set as claimed in claim 6, wherein said bottom ring has a suspension arm having a through hole at a distal end thereof.

11. An upper set for a headset of a bicycle, comprising:
    a bearing;
    a compression ring abutted against an inner periphery of said bearing; and
    a top cover having a bottom ring abutted against a top of said compression ring, a side wall extending upwards from said bottom ring, a C-shaped clip extending upwards from a top end of said side wall and having a through hole at each of two distal ends of said C-shaped clip, and a fastening unit passing through said through holes of said C-shaped clip for tightening said C-shaped clip,
    wherein said side wall connects said C-shaped clip and said bottom ring, and said C-shaped clip and said bottom ring are spaced from one another.

12. The upper set as claimed in claim 11, wherein said fastening unit includes a bolt passing through said through holes of said C-shaped clip, and a nut threaded onto said bolt.

13. The upper set as claimed in claim 11, wherein said fastening unit is a quick release unit.

14. The upper set as claimed in claim 11, wherein said fastening unit has a bolt passing through said through holes of said C-shaped clip and one of said through holes of said C-shaped clip has internal threads to be threaded with said bolt.

15. The upper set as claimed in claim 11, wherein said bottom ring has a suspension arm having a through hole at a distal end thereof.

* * * * *